US006230183B1

(12) United States Patent
Yocom et al.

(10) Patent No.: US 6,230,183 B1
(45) Date of Patent: May 8, 2001

(54) METHOD AND APPARATUS FOR CONTROLLING THE NUMBER OF SERVERS IN A MULTISYSTEM CLUSTER

(75) Inventors: Peter B. Yocom; Catherine K. Eilert, both of Wappingers Falls; John E. Arwe, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/038,573

(22) Filed: Mar. 11, 1998

(51) Int. Cl.[7] .................................................. G06F 13/00
(52) U.S. Cl. ............................................................ 709/105
(58) Field of Search .................................... 709/220, 225, 709/226, 232, 105; 707/530

(56) References Cited

U.S. PATENT DOCUMENTS

| 4,468,736 | 8/1984 | DeSantis et al. | 709/106 |
| 5,170,466 | * 12/1992 | Rogan et al. | 707/530 |
| 5,253,342 | * 10/1993 | Blount et al. | 709/232 |

(List continued on next page.)

FOREIGN PATENT DOCUMENTS

| 0 694 837 A1 | 1/1996 | (EP) . |
| 0 750 256 A2 | 12/1996 | (EP) . |
| 0 798 639 A1 | 10/1997 | (EP) . |

(List continued on next page.)

OTHER PUBLICATIONS

IBM Technical Bulletin, vol. 40, No. 07, Jul. 1997 entitled "Method of Compute Resource Allocation in a Batch Job Submission Environment", pp. 7–8.

EPEMA, D.H.J. et al., "A Worldwide Flock Of Condors: Load Sharing Among Workstation Clusters", Future Generations Computer Systems, NL, Elsevier Science Publishers, Amsterdam, vol. 12, No. 1, May 1, 1996, pp. 53–65, XP000591704, ISSN: 0167–739X.

IBM Technical Disclosure Bulletin, vol. 33, No. 6B, 11/90 "Direct Interface To Submit and Process User's Request", pp. 126–127.

(List continued on next page.)

*Primary Examiner*—Robert B. Harrell
(74) *Attorney, Agent, or Firm*—William A. Kinnaman, Jr.

(57) ABSTRACT

A method and apparatus for controlling the number of servers in a multisystem cluster. Incoming work requests are organized into service classes, each of which has a queue serviced by servers across the cluster. Each service class has defined for it a local performance index for each particular system of the cluster and a multisystem performance index for the cluster as a whole. Each system selects one service class as a donor class for donating system resources and another service class as a receiver class for receiving system resources, based upon how well the service classes are meeting their goals. Each system then determines the resource bottleneck causing the receiver class to miss its goals. If the resource bottleneck is the number of servers, each system determines whether and how many servers should be added to the receiver class, based upon whether the positive effect of adding such servers on the performance index for the receiver class outweighs the negative effect of adding such servers on the performance measure for the donor class. If a system determines that servers should be added to the receiver class, it then determines the system in the cluster to which the servers should be added, based upon the effect on other work on that system. To make this latter determination, each system first determines whether another system has enough idle capacity and, if so, lets that system add servers. If no system has sufficient idle capacity, each system then determines whether the local donor class will miss its goals if servers are started locally. It not, the servers are started on the local system. Otherwise, each system determines where the donor class will be hurt the least and acts accordingly. To ensure the availability of a server capable of processing each of the work requests in the queue, each system determines whether there is a work request in the queue with an affinity only to a subset of the cluster that does not have servers for the queue and, if so, starts a server for the queue on a system in the subset to which the work request has an affinity.

17 Claims, 8 Drawing Sheets

U.S. PATENT DOCUMENTS

| | | | |
|---|---|---|---|
| 5,283,897 | 2/1994 | Georgiadis et al. | 709/105 |
| 5,414,845 | 5/1995 | Behm et al. | 709/104 |
| 5,428,781 | 6/1995 | Duault et al. | 709/102 |
| 5,473,773 | 12/1995 | Aman et al. | 709/104 |
| 5,504,894 | 4/1996 | Ferguson et al. | 707/2 |
| 5,537,542 | 7/1996 | Eilert et al. | 395/184.01 |
| 5,603,029 * | 2/1997 | Aman et al. | 709/105 |
| 5,630,133 | 5/1997 | Hotea et al. | 709/101 |
| 5,675,739 * | 10/1997 | Eilert et al. | 709/226 |
| 5,974,462 * | 10/1999 | Aman et al. | 709/225 |

FOREIGN PATENT DOCUMENTS

| | | |
|---|---|---|
| 3-40034 | 2/1991 | (JP) . |
| 07281908 | 10/1995 | (JP) . |
| 07281982 | 10/1995 | (JP) . |
| 09101902 | 4/1997 | (JP) . |
| 09212468 | 8/1997 | (JP) . |

OTHER PUBLICATIONS

IBM Technical Disclosure Bulletin, vol. 39, No. 06, 6/96 "Distributed Parallel Build System for . . . Systems", pp. 63–68.

OS/390 MVS Planning: Workload Management, First Edition, Mar. 1996, Form No. GC28–1761–00.

OS/390 MVS Planning: Workload Management Services, First Edition, Mar. 1996, Form No. GC28–1773–00.

* cited by examiner

STATE SAMPLES FOR FIND BOTTLENECK

| CPU DELAY SAMPS | MPL DELAY SAMPS | SWAP DELAY SAMPS | AUX PAGING DELAY SAMPS | • • • | QUEUE DELAY SAMPS |
|---|---|---|---|---|---|
| FLAG | FLAG | FLAG | FLAG | • • • | FLAG |

METHOD AND APPARATUS FOR CONTROLLING THE NUMBER OF SERVERS IN A MULTISYSTEM CLUSTER

BACKGROUND OF THE INVENTION

1. Field of the Invention

This invention relates to a method and apparatus for controlling the number of servers in an information handling system in which incoming work requests belonging to a first service class are placed in a queue for processing by one or more servers.

2. Description of the Related Art

Systems in which incoming work requests are placed in a queue for assignment to an available server are well known in the art. Since the frequency at which the incoming requests arrive may not be readily controlled, the principal means of controlling system performance (measured by queue delay or the like) in such a queued system is to control the number of servers. Thus, it is known in the art to start an additional server when the length of the queue being served reaches a certain high threshold or to stop a server when the length of the queue being served reaches a certain low threshold. While such an expedient may achieve its design objectives, it is unsatisfactory in a system in which other units of work besides the queued work requests are contending for system resources. Thus, even though providing an additional server for a queue may enhance the performance of the work requests in that queue, providing such a server may so degrade the performance of other units of work being handled by the system that the performance of the system as a whole deteriorates.

Most current operating system software is not able to take over the responsibility for managing the number of servers according to the end-user oriented goals specified for the work requests and considering other work with independent goals running in the same computer system.

The commonly assigned copending application of J. D. Aman et al., Ser. No. 081828,440, filed Mar. 28, 1997, discloses a method and apparatus for controlling the number of servers on a particular system in which incoming work requests belonging to a first service class are placed in a queue for processing by one or more servers. The system also has units of work assigned to at least one other service class that acts as a donor of system resources. In accordance with the invention, a performance measure is defined for the first service class as well as for at least one other service class. Before adding servers to the first service class, there is determined not only the positive effect on the performance measure for the first service class, but also the negative effect on the performance measure for the other service class. Servers are added to the first service class only if the positive effect on the performance measure for the first service class outweighs the negative effect on the performance measure for the other service class.

While the invention disclosed in this copending application considers the impact on other work when deciding whether to add servers, it does so in the context of a single system. In a multisystem complex ("sysplex"), however, a single queue of work requests may be serviced by servers from across the complex. Thus, for a given queue, the decision may involve not only whether to add a server, but where to add the server to optimize overall sysplex performance.

SUMMARY OF THE INVENTION

The present invention relates to a method and apparatus for controlling the number of servers in a cluster of information handling systems in which incoming work requests belonging to a first service class are placed in a queue for processing by one or more servers. Some of the incoming work requests may have a requirement to run only on a subset of the servers in the cluster. Work requests that have such a requirement are said to have an affinity to the subset of systems in the cluster that they must run on. In accordance with this invention, servers are started on one or more of the systems in the clusters to process the work requests in the queue. The systems on which to start these servers are chosen to take advantage of the total capacity of the cluster of systems, to meet the affinity requirements of the work requests, and to minimize the effect on other work that might be running on the systems in the cluster. The system on which new servers are started also has units of work assigned to a second service class that acts as a donor of system resources. In accordance with the invention, a performance measure is defined for the first service class as well as for the second service class. Before adding servers to the first service class, there is determined not only the positive effect on the performance measure for the first service class, but also the negative effect on the performance measure for the second service class. Servers are added to the first service class only if the positive effect on the performance measure for the first service class outweighs the negative effect on the performance measure for the second service class.

The present invention allows system management of the number of servers across a cluster of system for each of a plurality of user performance goal classes based on the performance goals of each goal class. Tradeoffs are made that consider the impact of addition or removal of servers on competing goal classes.

DETAILED DESCRIPTION OF THE INVENTION

Figure 1:
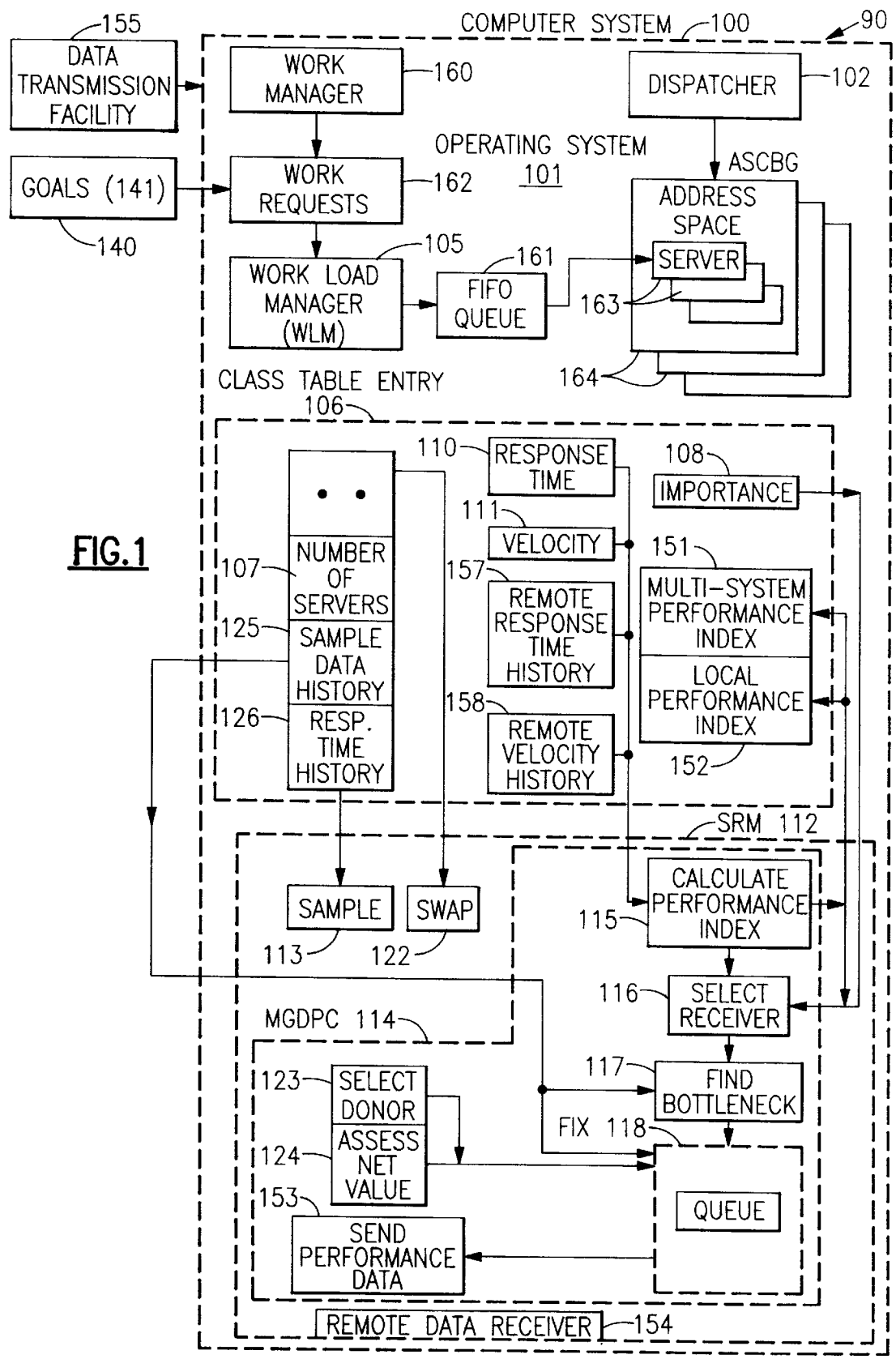
FIG. 1 is a system structure diagram showing particularly a computer system having a controlling operating system and system resource manager component adapted as described for the present invention.

As a preliminary to discussing a system incorporating the present invention, some prefatory remarks about the concept of workload management (upon which the present invention builds) are in order.

Workload management is a concept whereby units of work (processes, threads, etc.) that are managed by an operating system are organized into classes (referred to as service classes or goal classes) that are provided system resources in accordance with how well they are meeting predefined goals. Resources are reassigned from a donor class to a receiver class if the improvement in performance of the receiver class resulting from such reassignment exceeds the degradation in performance of the donor class, i.e., there is a net positive effect in performance as determined by predefined performance criteria. Workload management of this type differs from the run-of-the-mill resource management performed by most operating systems in that the assignment of resources is determined not only by its effect on the work units to which the resources are reassigned, but also by its effect on the work units from which they are taken.

Workload managers of this general type are disclosed in the following commonly owned patents, pending patent applications and non-patent publications, incorporated herein by reference:

U.S. Pat. No. 5,504,894 to D. F. Ferguson et al., entitled "Workload Manager for Achieving Transaction Class Response Time Goals in a Multiprocessing System";

U.S. Pat. No. 5,473,773 to J. D. Aman et al., entitled "Apparatus and Method for Managing a Data Processing System Workload According to Two or More Distinct Processing Goals";

U.S. Pat. No. 5,537,542 to C. K. Eilert et al., entitled "Apparatus and Method for Managing a Server Workload According to Client Performance Goals in a Client/Server Data Processing System";

U.S. Pat. No. 5,603,029 to J. D. Aman et al., entitled "System of Assigning Work Requests Based on Classifying into an Eligible Class Where the Criteria Is Goal Oriented and Capacity Information is Available";

U.S. Pat. No. 5,675,739 to C. K. Eilert et al., entitled "Apparatus and Method for Managing a Distributed Data Processing System Workload According to a Plurality of Distinct Processing Goal Types";

U.S. application Ser. No. 08/383,042, filed Feb. 3, 1995, of C. K. Eilert et al., entitled "Multi-System Resource Capping";

U.S. application Ser. No. 08/488,374, filed Jun. 7, 1995, of J. D. Aman et al., entitled "Apparatus and Accompanying Method for Assigning Session Requests in a Multi-Server Sysplex Environment";

U.S. application Ser. No. 08/828,440, filed Mar. 28, 1997, of J. D. Aman et al., entitled "Method and Apparatus for Controlling the Number of Servers in a Client/Server System";

MVS Planning: Workload Management, IBM publication GC28-1761-00, 1996;

MVS Programming: Workload Management Services, IBM publication GC28-1773-00, 1996.

Of the patents and applications, U.S. Pat. Nos. 5,504,894 and 5,473,773 disclose basic workload management systems; U.S. Pat. No. 5,537,542 discloses a particular application of the workload management system of U.S. Pat. No. 5,473,773 to client/server systems; U.S. Pat. No. 5,675,739 and application Ser. No. 08/383,042 disclose particular applications of the workload management system of U.S. Pat. No. 5,473,773 to multiple interconnected systems; U.S. Pat. No. 5,603,029 relates to the assignment of work requests in a multisystem complex ("sysplex"); application Ser. No. 08/488,374 relates to the assignment of session requests in such a complex; and, as noted above, application Ser. No. 08/828,440 relates to the control of the number of servers on a single system of a multisystem complex. The two non-patent publications describe an implementation of workload management in the IBM™ OS/390® (formerly MVS) operating system.

FIG. 1 illustrates the environment and the key features of the present invention for an exemplary embodiment comprising a cluster 90 of interconnected, cooperating computer systems 100, an exemplary two of which are shown. The environment of the invention is that of a queue 161 of work requests 162 and a pool of servers 163 distributed across the cluster 90 that service the work requests. The invention allows management of the number of servers 163 based on the performance goal classes of the queued work and the performance goal classes of competing work in the systems 100. Having a single policy for the cluster 90 of systems 100 helps provide a single-image view of the distributed workload. Those skilled in the art will recognize that any number of systems 100 and any number of such queues and groups of servers 163 within a single computer system 100 may be used without departing from the spirit or scope of the invention.

Computer systems 100 execute a distributed workload, and each is controlled by its own copy of an operating system 101 such as the IBM OS/390 operating system.

Each copy of the operating system 101 on a respective computer system 100 executes the steps described in this specification. When the description herein refers to a "local" system 100, it means the system 100 that is executing the steps being described. The "remote" systems 100 are all the other systems 100 being managed. Note that each system 100 considers itself local and all other systems 100 remote.

Except for the enhancements relating to the present invention, system 100 is similar to the ones disclosed in copending application Ser. No. 08/282,440 and U.S. Pat. No. 5,675,739. As shown in FIG. 1, system 100 is one of a plurality of interconnected systems 100 that are similarly managed and make up a cluster 90 (also referred to as a system complex, or sysplex). As taught in U.S. Pat. No. 5,675,739, the performance of various service classes into which units of work may be classified may be tracked not only for a particular system 100, but for the cluster 90 as a whole. To this end, and as will be apparent from the description below, means are provided for communicating performance results between system 100 and other systems 100 in the cluster 90.

Dispatcher 102 is a component of the operating system 101 that selects the unit of work to be executed next by the computer. The units of work are the application programs that do the useful work that is the purpose of the computer system 100. The units of work that are ready to be executed are represented by a chain of control blocks in the operating system memory called the address space control block (ASCB) queue.

Work manager 160 is a component outside of the operating system 101 which uses operating system services to define one or more queues 161 to a workload manager (WLM) 105 and to insert work requests 162 onto these queues. The work manager 160 maintains the inserted requests 162 in first-in first-out (FIFO) order for selection by servers 163 of the work manager 160 on any of the systems 100 in the cluster 90. The work manager 160 ensures that a server only selects requests that have affinity to the system 100 that the server is running on.

Servers 163 are components of the work manager 160 which are capable of servicing queued work requests 162.

When the workload manager 105 starts a server 163 to service requests 162 for a work manager 160's queue 161, the workload manager uses server definitions stored on a shared data facility 140 to start an address space (i.e., process) 164. The address space 164 started by the workload manager 105 contains one or more servers (i.e., dispatchable units or tasks) 163 which service requests 162 on the particular queue 161 that the address space should service, as designated by the workload manager.

Figures 1A, 2:
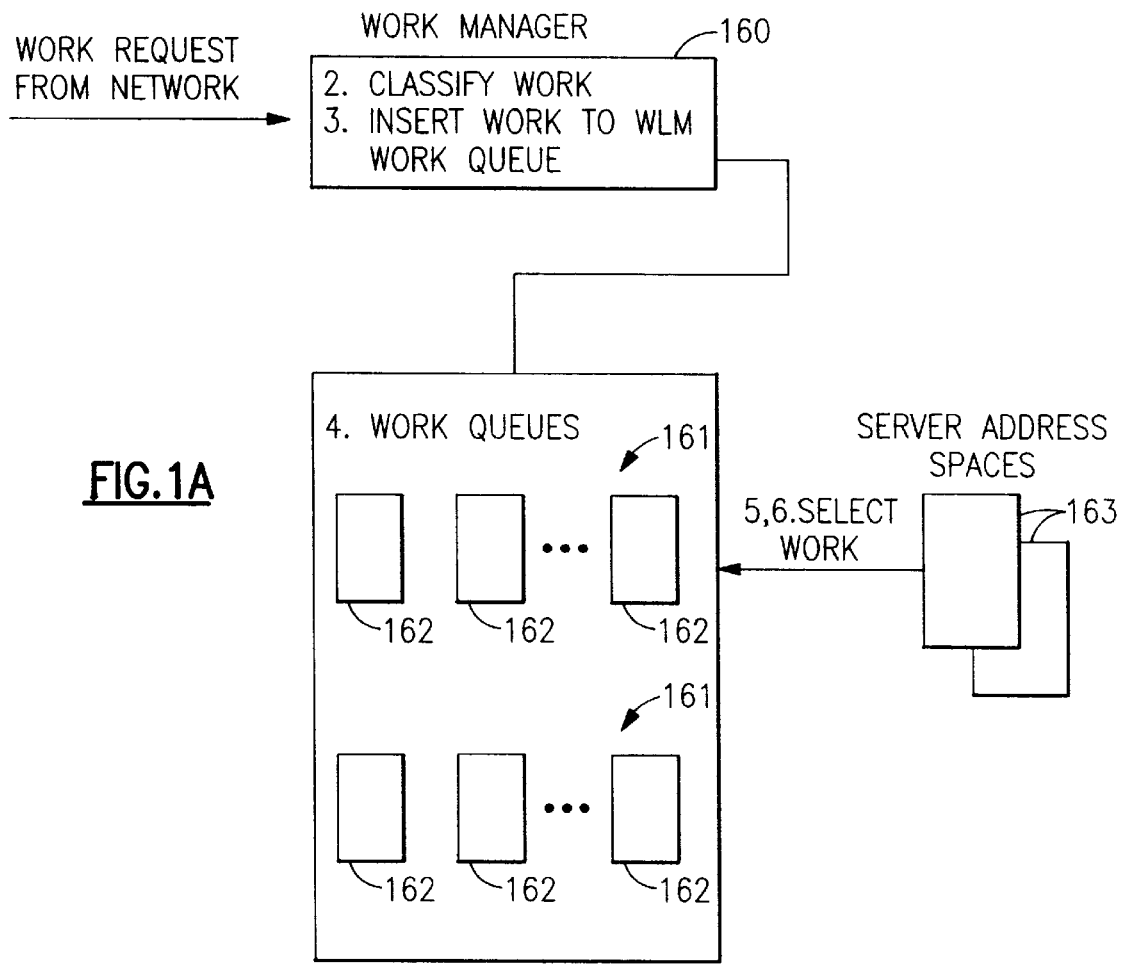
FIG. 1A shows the flow of a client work request from the network to a server address space managed by the workload manager of the present invention.
FIG. 2 illustrates the state data used to select resource bottlenecks.

FIG. 1A shows the flow of a client work request 162 from a network (not shown) to which system 100 is connected to a server address space 164 managed by the workload manager 105. A work request 162 is routed to a particular system 100 in the cluster 90 and received by a work manager 160. Upon receiving the work request 162, the work manager 160 classifies it to a WLM service class and inserts the work request into a work queue 161. The queue 161 is shared by all systems 100 in the cluster 90; i.e., queue 161 is a cluster-wide queue. The work request 162 waits in the work queue 161 until there is a server 163 ready to run it.

A task 163 in a server address space 164 on some system 100 in the cluster 90 that is ready to run a new work request 162 (either the space has just been started or the task finished running a previous request) calls the work manager 160 for a new work request. If there is a request 162 on the work queue 161 the address space 164 is serving and the request has affinity to the system 100 on which the server is running, the work manager 160 passes the request to the server 163. Otherwise, the work manager 160 suspends the server 163 until a request 162 is available.

When a work request 162 is received by a work manager 160, it is put on a work queue 161 to wait for a server 163 to be available to run the request. There is one work queue 161 for each unique combination of work manager 160, application environment name, and WLM service class of the work request 162. (An application environment is the environment that a set of similar client work requests 162 needs to execute. In OS/390 terms this maps to the job control language (JCL) procedure that is used to start the server address space to run the work requests.) The queuing structures are built dynamically when the first work request 162 for a specific work queue 161 arrives. The structures are deleted when there has been no activity for a work queue 161 for a predetermined period of time (e.g., an hour). If an action is taken that can change the WLM service class of the queued work requests 162, like activating a new WLM policy, the workload manager 105 notifies the work manager 160 of the change and the work manager 160 rebuilds the work queues 161 to reflect the new WLM service class of each work request 162.

Figure 7:
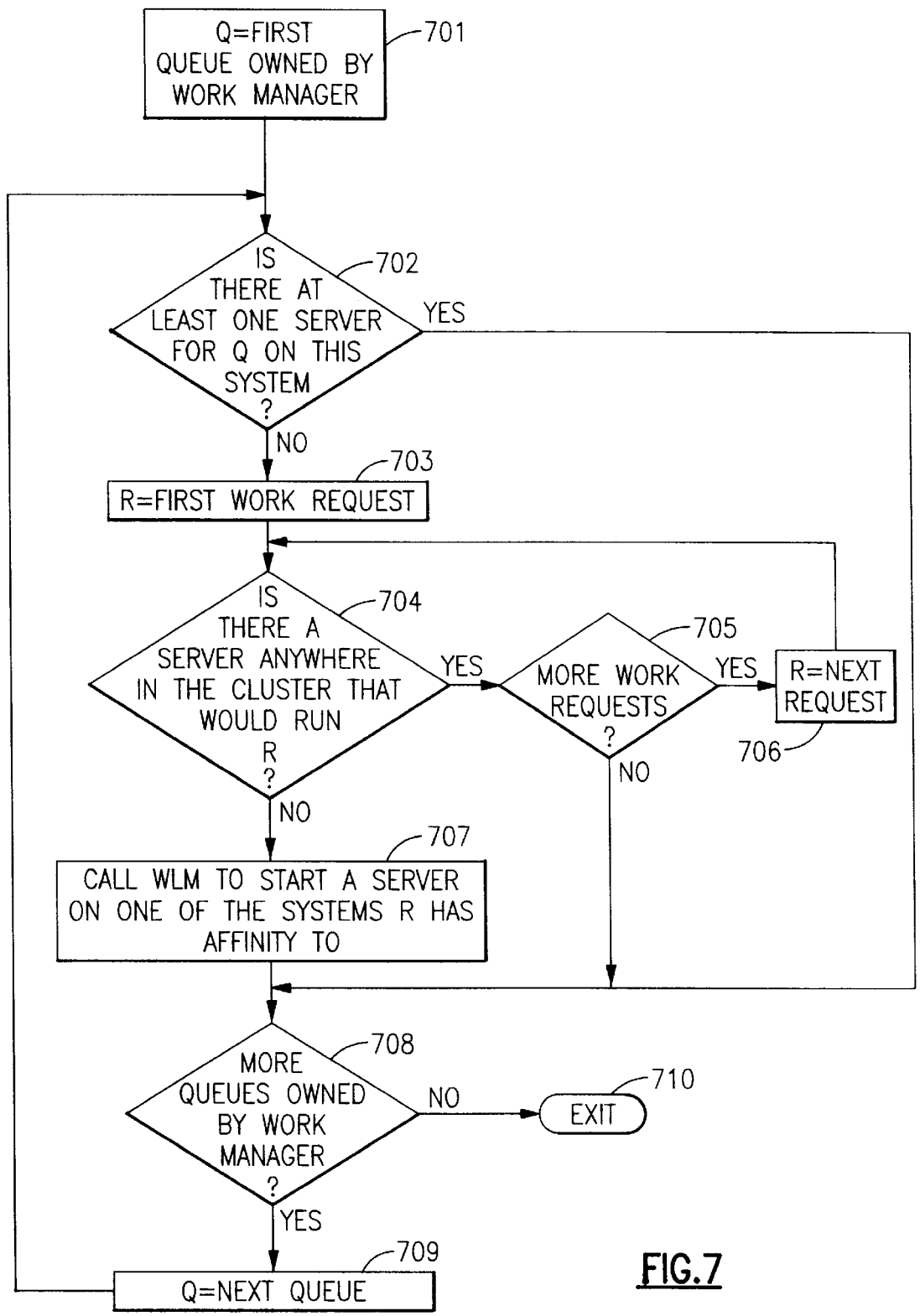
FIG. 7 shows the procedure for ensuring that there is at least one server somewhere in the cluster that can run each request on the queue.

There is a danger that a work request 162 that has a affinity to a system 100 with no servers 163 might never run if there are enough servers on other systems 100 to allow the work request's service class to meet its goal. To avoid this danger the workload manager 105 ensures that there is at least one server 163 somewhere in the cluster 90 that can run each request on the queue 161. FIG. 7 shows this logic. This logic is run by the work manager 160 on each system 100 in the cluster 90.

At step 701 the work manager 160 looks at the first queue 161 it owns. At step 702 the work manager 160 checks to see if there is a server 163 for this queue 161 on the local system 100. If there is a server 163, the work manager 160 goes on to the next queue 161 (steps 708–709). If the work manager 160 finds a queue 161 with no servers 163 locally, the work manager next looks at each work request 162 on the queue, beginning with the first work request (steps 703–706). For each work request 162 the work manager 160 checks if there is a server 163 anywhere in the cluster 90 that can run the current work request (step 704). If there is a server 163 that can run the current work request, the work manager 160 goes on to the next request 162 on the queue 161 (step 706). If there is no server 163 that can run the work request 162, the work manager 160 calls the workload manager 105 to start a server 163 (step 707) and then goes on to the next queue 161 (step 708–709). The work manager 160 continues in a similar manner until all queues 161 owned by the work manager have been processed (step 710)

To determine the best system 100 on which to start a server for a request when the work manager 160 calls workload manager 105 (707), workload manager 105 keeps a Service Available Array for each system 100 in the cluster 90 which indicates the service available at each importance and the unused service for that system. The array includes an entry for each importance (e.g. importances 0–6) and one for unused service, as depicted below:

| Array Element | Array Element Content |
| --- | --- |
| array element 1 | service avail. at importance 0 |
| array element 2 | service avail. at importance 1 |
| array element 3 | service avail. at importance 2 |
| array element 4 | service avail. at importance 3 |
| array element 5 | service avail. at importance 4 |
| array element 6 | service avail. at importance 5 |
| array element 7 | service avail. at importance 6 |
| array element 8 | unused service |

The Service Available Array is also described in the commonly assigned copending application of applicant C. K. Eilert et al., Ser. No. 08/827,529, filed Mar. 28, 1997, entitled "Managing Processor Resources in a Multisystem Environment", incorporated herein by reference.

Workload manager 105 starts a new server on the system 100 with the most service available at the importance of the request's service class. Subsequent spaces 164 are started when required to support the workload (see policy adjustment discussion below). Preferably, the mechanism to start spaces 164 has several features to avoid common problems in other implementations that automatically start spaces. Thus, starting of spaces 164 is preferably paced so that only one start is in progress at time. This pacing avoids flooding the system 100 with address spaces 164 being started.

Also, special logic is preferably provided to prevent creation of additional address spaces 164 for a given application environment if a predetermined number of consecutive start failures (e.g., 3 failures) are encountered for which the likely cause is a JCL error in the JCL proc for the application environment. This avoids getting into a loop trying to start an address spaces that will not successfully start until the JCL error is corrected.

Additionally, if a server address space 164 fails while running a work request 162, workload manager 105 preferably starts a new address space to replace it. Repeated failures cause workload manager 105 to stop accepting work requests for the application environment until informed by an operator command that the problem has been solved.

A given server address space 164 is physically capable of serving any work request 162 for its application environment even though it normally only serves a single work queue 161. Preferably, when a server address space 164 is no longer needed to support its work queue 161, it is not terminated immediately. Instead, the server address space 164 waits for a period of time as a "free agent" to see if it can be used to support another work queue 161 with the same application environment. If the server address space 164 can be shifted to a new work queue 161, the overhead of starting a new server address space for that work queue is avoided. If the server address space 164 is not needed by another work queue 161 within a predetermined period (e.g., 5 minutes), it is terminated.

The present invention takes as input the performance goals 141 and server definitions established by a system administrator and stored on a data storage facility 140. The data storage facility 140 is accessible by each system 100 being managed. The performance goals illustrated here are of two types: response time (in seconds) and execution velocity (in percent). Those skilled in the art will recognize that other goals, or additional goals, may be chosen without departing from the spirit or scope of the invention. Included with the performance goals is the specification of the relative importance of each goal. The goals 141 are read into each system 100 by the workload manager component 105 of the operating system 101 on each of the systems 100 being managed. Each of the goals, which were established and specified by the system administrator, causes the workload manager 105 on each system 100 to establish a performance class to which individual work units are assigned. Each performance class is represented in the memory of the operating systems 101 by a class table entry 106. The specified goals (in an internal representation) and other information relating to the performance class are recorded in the class table entry. Other information stored in a class table entry includes the number 107 of servers 163 (a controlled variable), the relative importance 108 of the goal class (an input value), the multisystem performance index (PI) 151, the local performance index 152 (computed values representing performance measures), the response time goal 110 (an input value), the execution velocity goal 111 (an input value), sample data 113 (measured data), the remote response time history (157) (measured data), the remote velocity history 158 (measured data), the sample data history 125 (measured data), and the response time history 126 (measured data).

Operating system 101 includes a system resource manager (SRM) 112, which in turn includes a multisystem goal-driven performance controller (MGDPC) 114. These components operate generally as described in U.S. Pat. Nos. 5,473,773 and 5,675,739. However, MGDPC 114 is modified according to the present invention to manage the number of servers 163. MGDPC 114 performs the functions of measuring the achievement of goals, selecting the user performance goal classes that need their performance improved, and improving the performance of the user performance goal classes selected by modifying the controlled variables of the associated work units, as described later. The MGDPC function is performed periodically based on a periodic timer expiration approximately every ten seconds in the preferred embodiment. The interval at which the MGDPC function is performed is called the MGDPC interval or policy adjustment interval.

The general manner of operation of MGDPC 114, as described in U.S. Pat. No. 5,675,739, is as follows. At 115, a multisystem performance index 151 and a local performance index 152 are calculated for each user performance goal class 106 using the specified goal 110 or 111. The multisystem performance index 151 represents the performance of work units associated with the goal class across all the systems 100 being managed. The local performance index 152 represents the performance of work units associated with the goal class on the local system 100. The resulting performance indexes 151, 152 are recorded in the corresponding class table entry 106. The concept of a performance index as a method of measuring user performance goal achievement is well known. For example, in the above-cited U.S. Pat. No. 5,504,894 to Ferguson et al., the performance index is described as the actual response time divided by the goal response time.

At 116, a user performance goal class is selected to receive a performance improvement in the order of the relative goal importance 108 and the current value of the performance indexes 151, 152. The selected user performance goal class is referred to as the receiver. MGDPC 114 first uses the multisystem performance index 151 when choosing a receiver so that the action it takes has the largest possible impact on causing work units to meet goals across all the systems 100 being managed. When there is no action to take based on the multisystem performance index 151, the local performance index 152 is used to select a receiver that will most help the local system 100 meet its goals.

After a candidate receiver class has been determined, the controlled variable for that class that constitutes a performance bottleneck is determined at 117 by using state samples 125, a well-known technique. As described in U.S. Pat. No. 5,675,739, the controlled variables include such variables as protective processor storage target (affects paging delay), swap protect time (SPT) target (affects swap delay), multiprogramming level (MPL) target (affects MPL delay), and dispatch priority (affects CPU delay). In accordance with the present invention, the controlled variables also include the number of servers 163, which affects queue delay.

In FIG. 1 the number 107 of servers 163 is shown stored in the class table entry 106, which might be taken to imply a limitation of one queue 161 per class. However, this is merely a simplification for illustrative purposes; those skilled in the art will recognize that multiple queues 161 per class can be independently managed simply by changing the location of the data. The fundamental requirements are that the work requests 162 for a single queue 161 have only one goal, that each server 163 has equal capability to service requests, and that a server cannot service work on more than one queue 161 without notification from and/or to the workload manager 105.

After a candidate performance bottleneck has been identified, the potential changes to the controlled variables are considered at 118. At 123 a user performance goal class is selected for which a performance decrease can be made based on the relative goal importance 108 and the current value of the performance indexes 151, 152. The user performance goal class thus selected is referred to as the donor.

After a candidate donor class has been selected, the proposed changes are assessed at 124 for net value relative to the expected changes to the multisystem and local performance indexes 151, 152 for both the receiver and the donor for each of the controlled variables, including the number 107 of servers 163 and the variables mentioned above and in U.S. Pat. No. 5,675,739. A proposed change has net value if the result would yield more improvement for the receiver than harm to the donor relative to the goals. If the proposed change has net value, then the respective controlled variable is adjusted for both the donor and the receiver.

Each system 100 to be managed is connected to a data transmission mechanism 155 that allows each system 100 to send data records to every other system 100. At 153 a data record describing the recent performance of each goal class is sent to every other system 100.

The multisystem goal driven performance controller (MGDPC) function is performed periodically, (once every ten seconds in the preferred embodiment) and is invoked via a timer expiration. The functioning of the MGDPC provides a feedback loop for the incremental detection and correction of performance problems so as to make the operating system 101 adaptive and self-tuning.

At the end of the MGDPC interval a data record describing the performance of each goal class during the interval is sent to each remote system 100 being managed, as generally described in U.S. Pat. No. 5,675,739. For a performance goal class having response time goals, this data record contains the goal class name and an array with entries equivalent to a row of the remote response time history that describes the completions in the goal class over the last MGDPC interval. For a goal class with velocity goals this data record contains the goal class name, the count of times work in the goal class was sampled running in the last MGDPC interval, and the count of times work in the goal class was sampled as running or delayed in the last MGDPC interval. In accordance with the present invention, each system 100 sends as additional data the Service Available Array for the system 100 sending the data, the number of servers 163 for each queue 161, and the number of idle servers 163 for each queue 161.

At 154 a remote data receiver receives performance data from remote systems 100 asynchronously from MGDPC 114. The received data is placed in a remote performance data histories (157,158) for later processing by the MGDPC 114.

FIG. 2 illustrates the state data used by find bottleneck means 117 to select resource bottlenecks to address. For each delay type, the performance goal class table entry 106 contains the number of samples encountering that delay type and a flag indicating whether the delay type has already been selected as a bottleneck during the present invocation of MGDPC 1 14. In the case of the cross-memory-paging type delay, the class table entry 106 also contains identifiers of the address spaces that experienced the delays.

Figure 3:
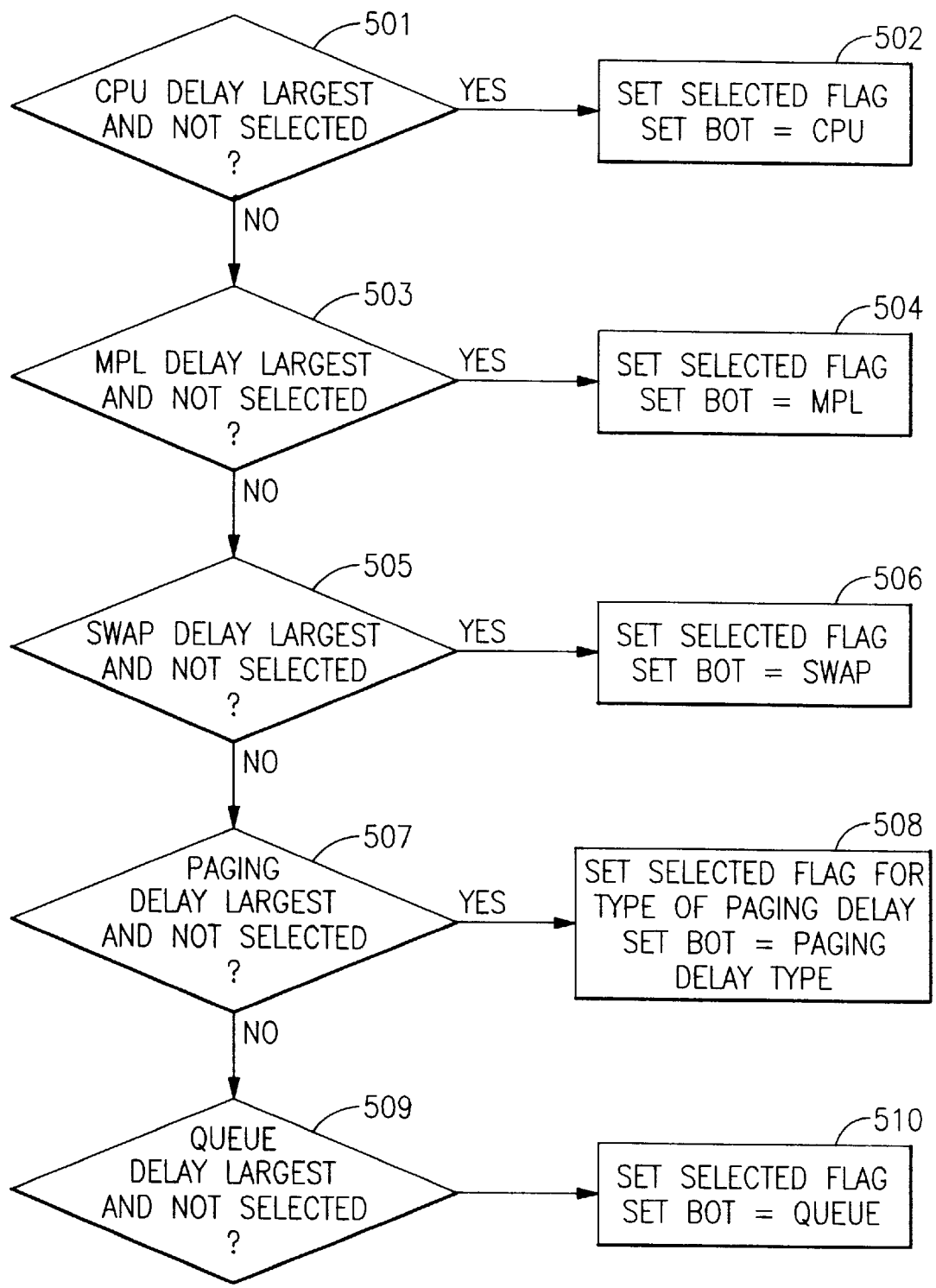
FIG. 3 is a flowchart showing logic flow for the find-bottleneck function.

The logic flow of the find bottleneck means 117 is illustrated in FIG. 3. The selection of a bottle-neck to address is made by selecting the delay type with the largest number of samples that has not already been selected during the present invocation of MGDPC 114. When a delay type is selected, the flag is set so that delay type is skipped if the find bottleneck means is reinvoked during this invocation of MGDPC 114.

In FIG. 3 at 501, a check is made to determine whether the CPU delay type has the largest number of delay samples of all the delay types that have not yet been selected. If yes, at 502 the CPU-delay-selected flag is set and CPU delay is returned as the next bottleneck to be addressed.

At 503 a check is made to determine whether the MPL delay type has the largest number of delay samples of all the delay types that have not yet been selected. If yes, at 504 the MPL-delay-selected flag is set and MPL delay is returned as the next bottleneck to be addressed.

At 505 a check is made to determine whether the swap delay type has the largest number of delay samples of all the delay types that have not yet been selected. If yes, at 506 the swap-delay-selected flag is set and swap delay is returned as the next bottleneck to be addressed.

At 507 a check is made to determine whether the paging delay type has the largest number of delay samples of all the delay types that have not yet been selected. If yes, at 508 the paging-delay-selected flag is set and paging delay is returned as the next bottleneck to be addressed. There are five types of paging delay. At 507, the type with the largest number of delay samples is located, and at 508, the flag is set for the particular type and the particular type is returned. The types of paging delay are: private area, common area, cross memory, virtual input/output (VIO), and hiperspace, each corresponding to a page delay situation well known in the environment of the preferred embodiment (OS/390).

Finally, at 509 a check is made to determine whether the queue delay type has the largest number of delay samples of all the delay types that have not yet been selected. A class gets one queue delay type sample for each work request on the queue 161 that is eligible to run on the local system 100. If yes, at 510 the queue-delay-selected flag is set and queue delay is returned as the next bottleneck to be addressed. Queue delay is not addressed on the local system 100 if another system 100 in the cluster 90 has started servers 163 for the queue 161 during the last policy adjustment interval. Queue delay is also not addressed if the candidate receiver class has swapped out ready work.

The following section describes how the receiver performance goal class performance is improved by changing a controlled variable to reduce the delay selected by the find bottleneck means 117 and, in particular, how performance is improved by reducing the queue delay experienced by the receiver. For a shared queue 161 this is a two-step process. First an assessment is made of adding the servers 163 on the local system 100 including the impact on the donor work. If there is net value in adding the servers 163, the next step is to determine if the servers should be started on the local system 100 or they should be started on another system 100 in the cluster 90. If a remote system 100 seems like a better place to start the servers 163, the local system 100 waits to give that system a chance to start the servers. However if that system 100 does not start the servers 163, the local system 100 starts them, as described below in conjunction with FIG. 8.

Figure 4:
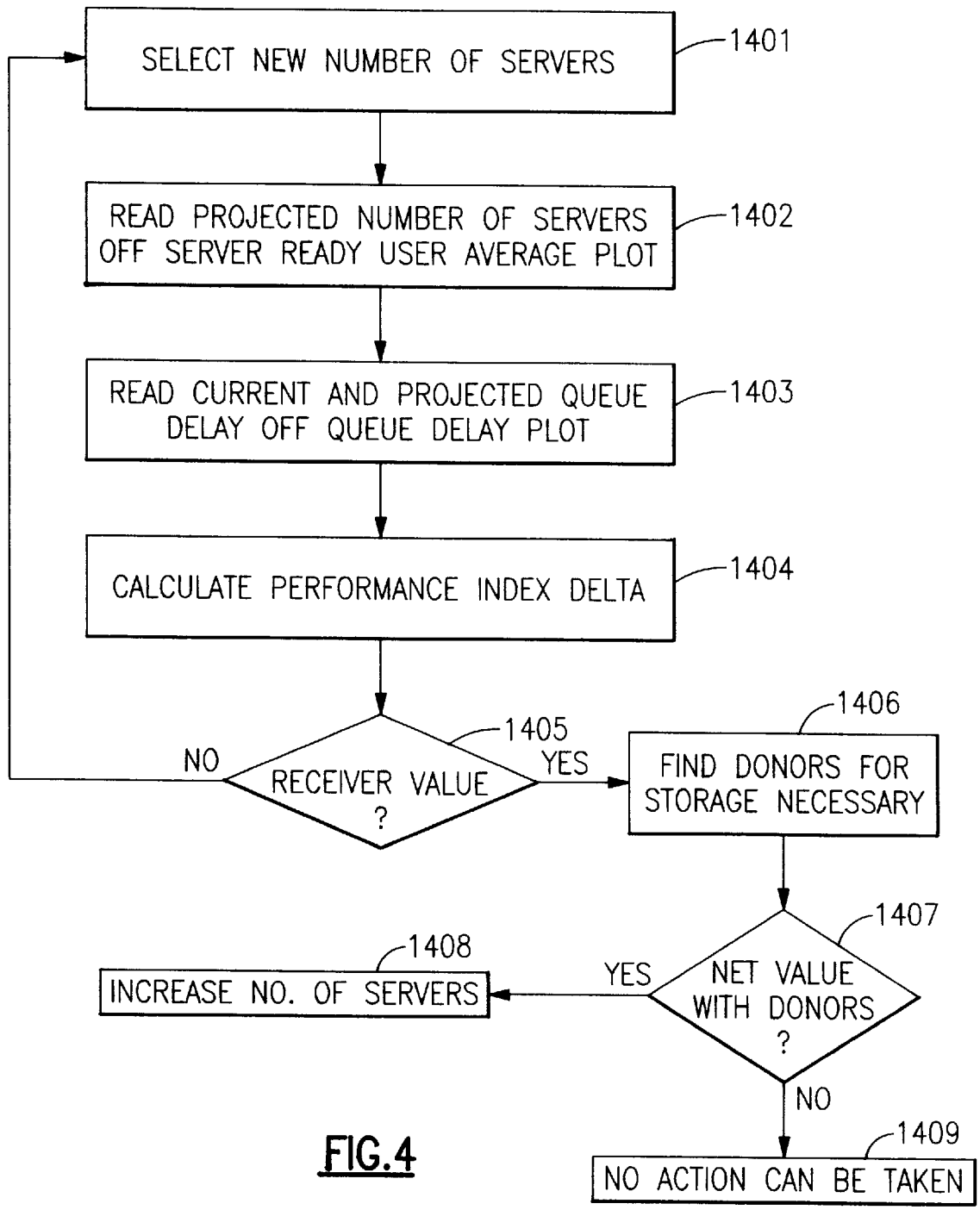
FIG. 4 is a flowchart of the steps to assess improving performance by increasing the number of servers.
Figure 5:
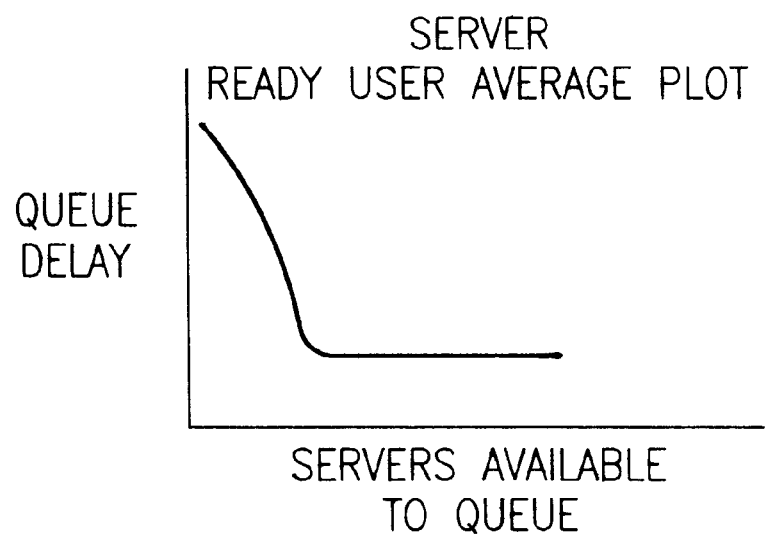
FIG. 5 is a sample graph of queue ready user average.
Figure 6:
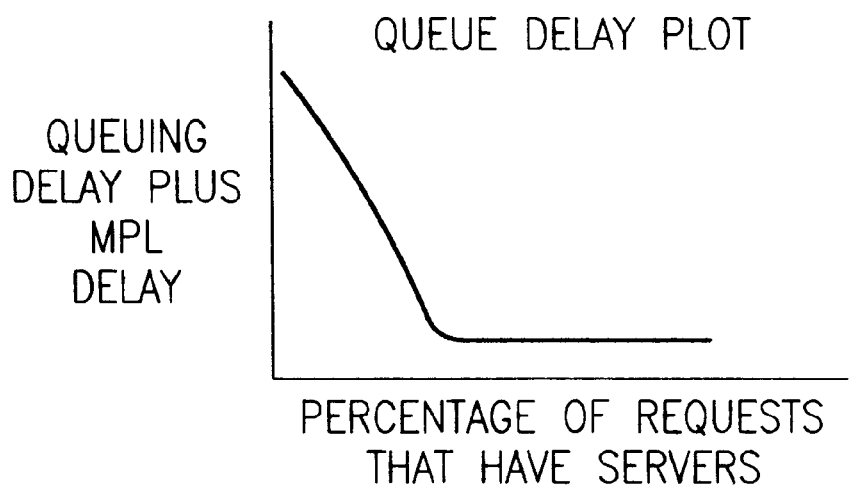
FIG. 6 is a sample graph of queue delay.

FIG. 4 shows the logic flow to assess improving performance by starting additional servers 163. FIGS. 4–6 illustrate the steps involved in making the performance index delta projections provided by the fix means 118 to the net value means 124. At 1401, a new number of servers 163 is selected to be assessed. The number must be large enough to result in sufficient receiver value (checked at 1405) to make the change worthwhile. The number must not be so large that the value of additional servers 163 is marginal, for example, not more than the total number of queued and running work requests 162. The next step is to calculate the additional CPU the additional servers 163 will use; this is done by multiplying the average CPU used by a work request by the additional servers 163 to be added.

At 1402, the projected number of work requests 162 at the new number of servers 163 is read from the server ready user average graph shown in FIG. 5. At 1403, the current and projected queue delays are read from the queue delay graph shown in FIG. 6. At 1404, the projected local and multisystem performance index deltas are calculated. These calculations are shown below.

FIG. 5 illustrates the queue ready user average graph. The queue ready user average graph is used to predict the demand for servers 163 when assessing a change in the number of servers 163 for a queue 161. The graph can show the point at which work requests 162 will start backing up. The abscissa (x) value is the number of servers 163 available to the queue 161. The ordinate (y) value is the maximum number of work requests 162 ready to execute.

FIG. 6 illustrates the queue delay graph. The queue delay graph is used to assess the value of increasing or decreasing the number of servers 163 for a queue 161. The graph shows how response time may be improved by increasing the number of queue servers 163 or how response time may be degraded by reducing the number of queue servers 163. It also will implicitly consider contention for resources not managed by the workload manager 105 which might be caused by adding additional servers 163, for example, database lock contention. In such a case the queue delay on the graph will not decrease as additional servers 163 are added. The abscissa value is the percentage of ready work requests 162 that have a server 163 available and swapped in across the cluster 90 of systems 100. The ordinate value is the queue delay per completion.

Sysplex (i.e., multisystem) performance index (PI) deltas for increases in the number of servers 163 are calculated as follows. Note that only sysplex performance index deltas are calculated because a queue 161 is a sysplex wide resource.

For response time goals:
(projected sysplex PI delta)=
(projected queue delay−current queue delay)/response time goal
For velocity goals:
(new sysplex velocity)=
cpuu+((cpuu/oldserver)*newserver)
non idle+((qd/qreq)*(oldserver−newserver))
(sysplex PI delta)=
(current sysplex PI−goal)/new sysplex velocity
Where:
cpuu is the sysplex CPU-using samples;
oldserver is the number of servers 163 before the change being assessed is made;
newserver is the number of servers 163 after the change being assessed is made;
non-idle is the total number of sysplex non-idle samples;
qd is the sysplex queue delay samples; and
qreq is the number of work requests 162 on the queue 161.

Similar calculations are used to calculate performance index deltas for decreases in the number of servers 163.

At 1405, a check is made for sufficient receiver value provided by the additional number of servers 163. Preferably, this step includes the step of determining whether the new servers 163 would get enough CPU time to make adding them worthwhile. If there is not sufficient receiver value, control returns to 1401 where a larger number of servers 163 is selected to be assessed.

If there is sufficient receiver value, at 1406 select donor means 123 is called to find donors for the storage needed to start the additional servers 163 on behalf of the receiver performance goal class.

The controlled variable that is adjusted for the donor class need not necessarily be the number 107 of servers 163 for that class. Any one of several different controlled variables of the donor class, such as MPL slots or protected processor storage, may be alternatively or additionally adjusted to provide the necessary storage for the additional servers 163. The manner of assessing the effect on the donor class of adjusting such controlled variables, while forming no part of the present invention, is described in U.S. Pat. Nos. 5,537, 542 and 5,675,739.

At 1407, a check is made to ensure that there is net value in taking storage from the donors to increase the number of servers 163 for the receiver class. As described in U.S. Pat. Nos. 5,675,739, this may be determined using one or more of several different criteria, such as whether the donor is projected to meet its goals after the resource reallocation, whether the receiver is currently missing its goals, whether the receiver is a more important class than the donor, or whether there is a net gain in the combined performance indexes of the donor and the receiver - - - i.e., whether the positive effect on the performance index for the receiver class of adding servers to the receiver class outweighs the negative effect on the performance index of the donor class of adding servers to the receiver class. If there is net value, the next step is to determine if the local system 100 is the best system in the cluster 90 to start the new servers 163 (1408); otherwise, the receiver goal class queue delay problem cannot be solved (1409).

Figure 8:
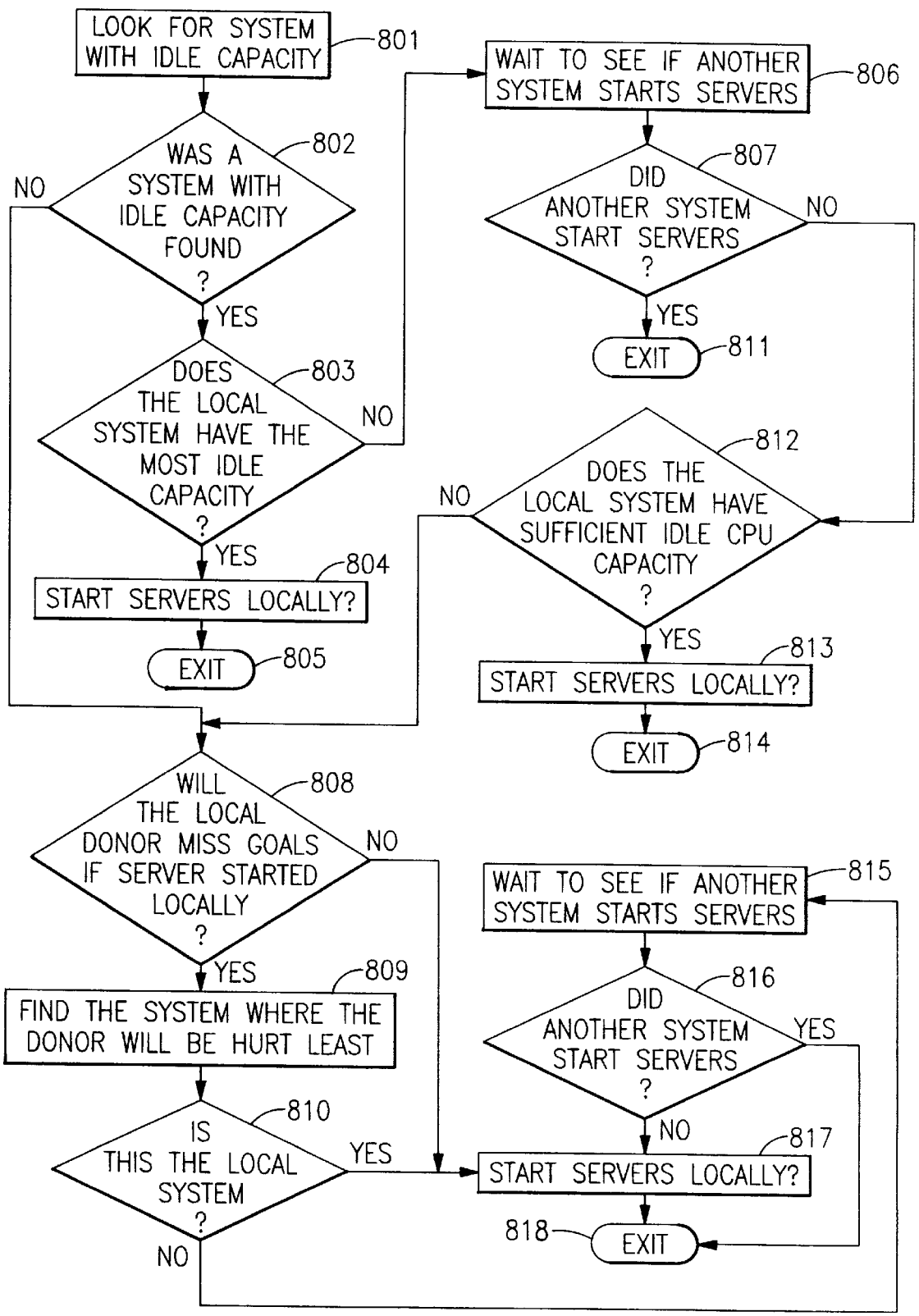
FIG. 8 shows the procedure for determining the best system in the cluster on which to start a server.

FIG. 8 shows the procedure for determining a target system representing the best system 100 in the cluster 90 on which to start the new servers 163. This procedure is done as part of step 1408 by each system 100 in the cluster 90, once it is determined that there is net value to adding more servers and that one or more servers 163 should be added to the receiver class. The local system 100 first checks to see if any system 100 in the cluster 90 has enough idle capacity to support the new servers 163 without impacting other work (step 801). This done by looking at the Service Available Array for each system 100 in the cluster 90 and choosing the system 100 with enough CPU service available at array element 8 (unused CPU service) to support the new servers 163. If multiple systems 100 have sufficient unused CPU service, the system 100 with the most unused service is chosen. However systems 100 with idle servers 163 are not chosen because if a system 100 has idle servers when there is queued work request it means many work requests do not have affinity to that system 100.

The local system 100 then checks to see if a target system 100 was found with enough idle CPU capacity to start the servers 163 (step 802). If a target system 100 is found and it is the local system 100 (step 803), the local system 100 starts the servers 163 locally (steps 804-805).

If at step 803 it is found that another system 100 has the most idle capacity to start the new servers 163, control passes to step 806, where the local system 100 waits for a policy adjustment interval (10 seconds) and then checks to see if another system 100 has started the servers 163 (step 807). If another system 100 has started the servers 163, no action is taken locally (step 811). If no other system 100 has started the servers 163, the local system 100 checks to see if it has sufficient idle CPU capacity to support the new servers 163 (step 812). If it has, the local system 100 starts the servers 163 locally (steps 813-814).

Control passes to step 808 if there were no systems 100 that had sufficient idle CPU capacity to support the new servers 163 or if there was a system 100 that had sufficient idle CPU capacity but that system 100 did not start servers. One reason that such a system 100 may not start servers 163 is that it has a memory shortage. At this point it is known that the new servers 163 cannot be started without impacting the donor work. The local system 100 therefore checks to see if starting the servers 163 locally will cause the donor work to miss its goals. If the donor work will not miss its goals, the local system 100 starts the servers 163 locally (steps 817-818). If starting the servers 163 locally will cause the donor class to miss its goal, the local system 100 then finds the system 100 where the impact on the donor work is the smallest (step 809).

Figure 9:
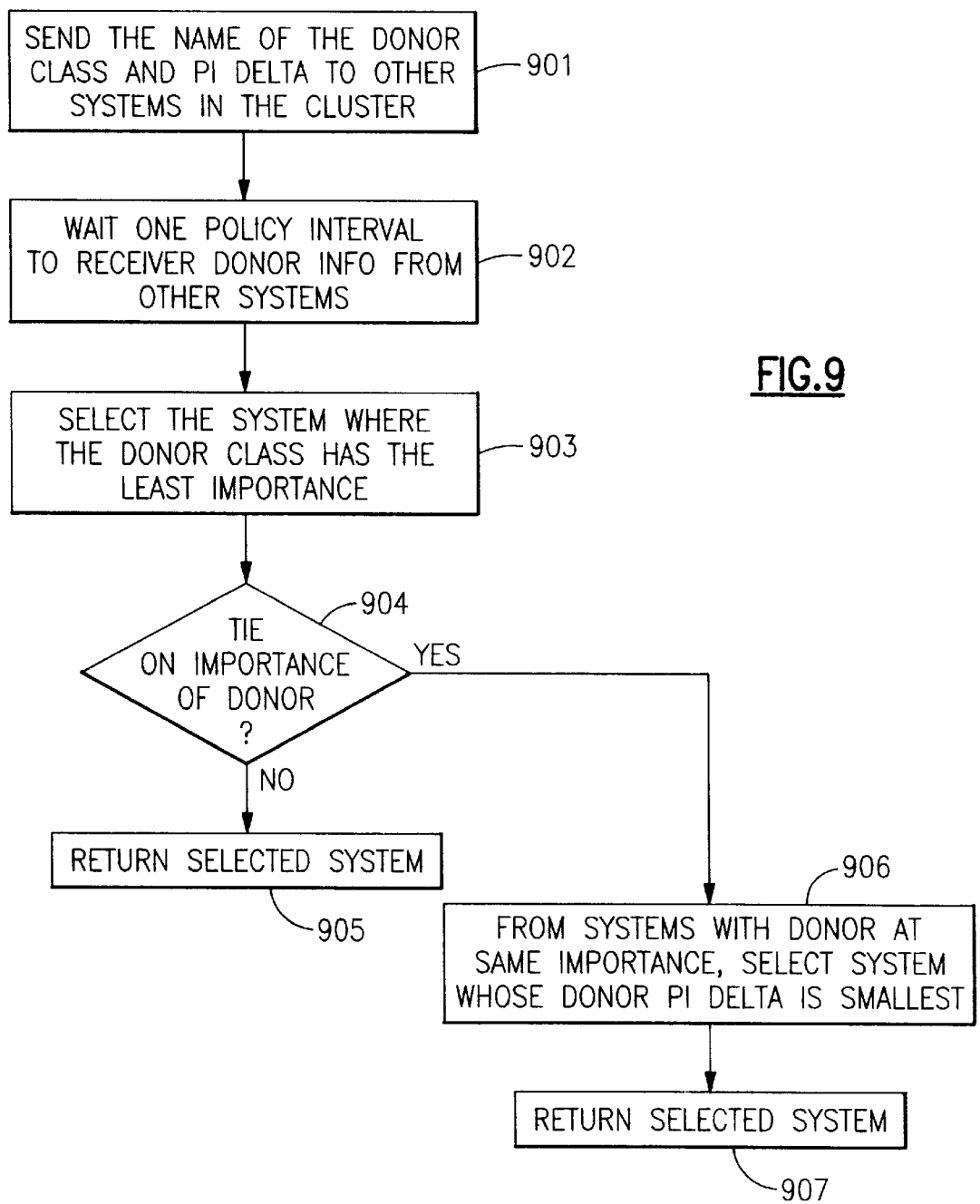
FIG. 9 shows the procedure for finding the system where the impact on the donor work is the smallest.

FIG. 9 shows the routine for determining at 809 the system 100 where the impact on the donor work is the smallest. The routine first sends the name of the donor class and the donor's performance index (PI) delta to the other systems 100 in the cluster 90 (step 901). By exchanging this donor information, each system 100 that is assessing adding servers 163 for the receiver class can see the impact of adding the servers on all the other systems 100. The routine then waits one policy interval (10 seconds in the embodiment shown) to allow the other systems 100 to send their donor information (step 902). The routine then selects the system 100 where the donor class has the least importance (step 903) and returns the selected system 100 to the calling routine to complete step 809 (step 905). If there is a tie on donor importance (step 904), the routine selects the system 100 where the donor's performance index (PI) delta is the smallest (step 906) and returns this system 100 to the calling routine (step 907).

Referring again to FIG. 8, after completing step 809 the local system 100 checks to see if the system 100 selected as having the least donor impact is the local system (step 810). If it is, the local system 100 starts the servers 163 locally (steps 817–818). Otherwise, the local system 100 waits a policy interval to allow another system 100 to start the servers 163 (step 815) and, at the end of this interval, checks to see if another system 100 has started the servers 163 (step 816). If another system 100 has started the servers 163, the local system 100 takes no action (step 818). If no other system 100 has started the servers 163, the local system 100 starts them locally (steps 817–818).

At 1408, logic is included to temporarily defer requests to start new servers 163 for the queue 161 under certain circumstances. Concurrent requests to start new servers 163 are limited to avoid unnecessary impact to existing work. This pacing ensures that the operating system 101 is not flooded with many concurrent requests to start additional servers 163, which can be disruptive. Detection of faulty information in the data repository 141 provided by the system administrator is also implemented, to prevent infinite retry loops if the server definition information is incorrect to the degree that new servers 163 cannot be successfully started. Once a server 163 is started, logic is also included to automatically replace a server should it fail unexpectedly. Idle servers 163 with identical server definition information but serving different queues 161 for the same work manager 160 may be moved between queues in order to satisfy requests to increase the number of servers 163 for a particular queue, thus avoiding the overhead of starting an entirely new server.

The invention is preferably implemented as software (i.e., a machine-readable program of instructions tangibly embodied on a program storage devices) executing on one or more hardware machines. While a particular embodiment has been shown and described, it will be apparent to those skilled in the art that other embodiments beyond the ones specifically described herein may be made or practiced without departing from the spirit of the invention. It will also will be apparent to those skilled in the art that various equivalents may be substituted for elements specifically disclosed herein. Similarly, changes, combinations and modifications of the presently disclosed embodiments will also be apparent. For example, multiple queues may be provided for each service class rather than the single queue disclosed herein. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

What is claimed is:

1. In a cluster of information handling systems in which incoming work requests belonging to a service class are placed in a cluster-wide queue for processing by one or more servers on the systems of the cluster, a method of controlling the number of such servers, comprising the steps of:

determining whether one or more servers should be added to the service class;

determining a target system in the cluster on which the servers should be added if it is determined that one or more servers should be added to the service class; and adding the servers on the target system.

2. The method of claim 1 in which the step of determining a target system in the cluster on which the servers should be added comprises the steps of:

determining whether any system in the cluster has sufficient idle capacity to add the one or more additional servers; and if any system in the cluster has sufficient idle capacity to add the one or more additional servers, selecting one such system as a target system.

3. The method of claim 2 in which the step of determining a target system in the cluster on which the servers should be added comprises the additional steps of:

if no system in the cluster has sufficient idle capacity to add the one or more additional servers, determining a system in the cluster where adding the one or more servers will have a least impact on other work: and selecting that system as a target system.

4. The method of claim 1 in which a system having a greatest amount of unused capacity is selected as a target system.

5. The method of claim 1 in which the determining steps are performed by each of the systems.

6. The method of claim 5 in which each of the systems determines whether it is a target system and adds one or more servers locally if it determines that it is a target system.

7. The method of claim 1 in which the service class is a first service class, the cluster having at least one other service class, each of the service classes having a performance measure defined for it.

8. The method of claim 7 in which the step of determining whether servers should be added to the first service class comprises the steps of:

determining a positive effect on the performance measure for the first service class of adding a predetermined number of servers to the first service class;

determining a negative effect on the performance measure for one or more other service classes of adding the predetermined number of servers to the first service class; and determining whether the positive effect on the performance measure for the first service class outweighs the negative effect on the performance measure for the one or more other service classes.

9. A program storage device readable by a machine, tangibly embodying a program of instructions executable by the machine to perform the method steps of claim 1.

10. In a cluster of information handling systems in which incoming work requests are placed in a queue for processing by one or more servers on the systems, a method of ensuring the availability of a server capable of processing each of the work requests in the queue, comprising the steps of:

determining whether there is a work request in the queue with an affinity only to a subset of the cluster that does not have servers for the queue; and starting a server for the queue on a system in the subset to which the work request has an affinity if it is determined that there is a work request in the queue with an affinity only to a subset of the cluster that does not have servers for the queue.

11. The method of claim 10 in which the determining step is performed at periodic intervals.

12. The method of claim 10 in which work requests assigned to different service classes are placed in different queues, the determining step being performed for each of the queues.

13. The method of claim 10 in which the determining step is performed by each system in the cluster.

14. The method of claim 13 in which the determining step comprises the steps of:

determining whether the queue has a server on the system; and determining whether there is a work request in the queue with an affinity only to a subset of the cluster only if the queue has no server on the system.

15. A program storage device readable by a machine, tangibly embodying a program of instructions executable by the machine to perform the method steps of claim 10.

16. In a cluster of information handling systems in which incoming work requests belonging to a service class are placed in a cluster-wide queue for processing by one or more servers on the systems of the cluster, apparatus for controlling the number of such servers, comprising:

means for determining whether one or more servers should be added to the service class;

means for determining a target system in the cluster on which the servers should be added if it is determined that one or more servers should be added to the service class; and means for adding the servers on the target system.

17. In a cluster of information handling systems in which incoming work requests are placed in a queue for processing by one or more servers on the systems, apparatus for ensuring the availability of a server capable of processing each of the work requests in the queue, comprising:

means for determining whether there is a work request in the queue with an affinity only to a subset of the cluster that does not have servers for the queue; and means for starting a server for the queue on a system in the subset to which the work request has an affinity if it is determined that there is a work request in the queue with an affinity only to a subset of the cluster that does not have servers for the queue.

* * * * *